United States Patent [19]

Hamada et al.

[11] Patent Number: 4,674,947
[45] Date of Patent: Jun. 23, 1987

[54] INDUSTRIAL ROBOT

[75] Inventors: Toyohide Hamada, Yokohama; Koichi Sugimoto, Hiratsuka; Kiyohide Koizumi; Shinichi Arai, both of Tokyo, all of Japan

[73] Assignee: Hitachi, Ltd., Tokyo, Japan

[21] Appl. No.: 777,289

[22] Filed: Sep. 18, 1985

Related U.S. Application Data

[63] Continuation of Ser. No. 437,308, Oct. 28, 1982, abandoned.

[30] Foreign Application Priority Data

Oct. 30, 1981 [JP] Japan ................................ 56-173033
Feb. 9, 1982 [JP] Japan ................................ 57-18131
Feb. 15, 1982 [JP] Japan ................................ 57-21102
Apr. 7, 1982 [JP] Japan ................................ 57-56585

[51] Int. Cl.$^4$ .................................................. B25J 9/06
[52] U.S. Cl. .................................. 414/735; 414/744 R; 901/15
[58] Field of Search .................. 414/729, 735, 744 R, 414/744 A, 4; 901/14, 15, 18, 19, 22-26

[56] References Cited

U.S. PATENT DOCUMENTS 3,255,893 6/1966 Hainer et al. ..................... 901/22 X
3,922,930 12/1975 Fletcher ............................ 901/26 X
4,428,710 1/1984 Grisebach et al. ......... 414/744 A X Primary Examiner—Frank E. Werner
Assistant Examiner—Donald W. Underwood
Attorney, Agent, or Firm—Antonelli, Terry & Wands

[57] ABSTRACT

There is disclosed in this application an industrial robot comprising: a first arm pivotally supported at its one end for rotation around a first axis; a second arm pivotally supported at its one end by the other end of the first arm for rotation around a second axis parallel to the first axis; a wrist mechanism carried by the free end of the second arm and having at least one degree of freedom; and driving motors for driving the first arm, the second arm and the wrist mechanism, respectively; wherein at least one of the first arm and the second arm is connected to the drive motor through a double link mechanism having a phase difference.

6 Claims, 18 Drawing Figures

INDUSTRIAL ROBOT

This is a continuation of application Ser. No. 437,308, filed Oct. 28, 1982 abandoned.

BACKGROUND OF THE INVENTION

This is a continuation of Application Ser. No. 437,308, filed Oct. 28, 1982, now abandoned.

The present invention relates to a construction of an industrial robot and, more particularly, to an arm driving mechanism and wrist mechanism for an industrial robot.

Recently, there has been progress in automatically assembly works by industrial robots in production processes and, for example, FIG. 1 provides a typical conventional industrial robot.

As shown in FIG. 1, an industrial robot is provided with two articulations, a first arm 1 and a second arm 2, with the first arm 1 being driven directly by a D.C. servo motor 3 provided on the base end thereof while the second arm 2, pivotally connected to the free end of the first arm 1, being directly driven by a D.C. servo motor 4 provided on the base end thereof. A pneumatic cylinder 5, secured to the free end of the second arm 2 has a piston rod to the end of which attached is a wrist 6 so that the wrist 6 is moved up and down as the piston rod of the pneumatic cylinder is extended and retracted. A pulse motor 7, fixed to the base 8, transmits the torque through timing belts 9, 9', 9'' to the wrist thereby causing a twisting action of the wrist.

The robot shown in FIG. 1 has two degrees of freedom attained by the first and the second rams 1, 2 within a horizontal plane, one degree of freedom in the vertical direction and one degree of freedom attained by the twisting of the wrist 6. One disadvantage of the industrial robot of the above described construction resides in the fact that, since the vertical movement of the wrist 6 is caused by a pneumatic cylinder, it is not possible to locate and fix the wrist 6 at the desired position in the vertical direction. It is true that the wrist 6 can be correctly stopped at its upper and lower stroke ends by providing with suitable stoppers but any change of the stopping positions necessitates a change of the stoppers. Thus, it is not easy to adapt this industrial robot to various operation patterns.

Another disadvantage resides in the fact that there is a large rotational inertia of the rotational members thereby making it difficult to attain high speed operation and to improve the precision of the stopping positions unless a drive motor of a drive capacity is used. One of the factors causing the large rotational inertia is the mass of the D.C. servo motor 4 on the free end of the first arm 1. Namely, it is necessary to move and swing the D.C. servo motor 4 when the first arm is swung.

In order to eliminate this problem, it has been proposed to fix the motor for swinging the second arm 2 to a stationary member and connecting the same to the second arm through a connecting rod and a crank. This transmission mechanism incorporating a crank and a connecting rod requires that the rotation angle of the second arm is considerably smaller than 180°. Namely, if the rotational angle is increased nearly to 180°, a dead point is formed at the stroke end to disable the transmission mechanism from transmitting the power.

More particularly, as shown in FIG..2, a conventional driving mechanism includes a crank 11 and a link 12 through which the power is transmitted from a motor 10 to the arm 13 to drive the latter. In this driving mechanism, the force F' for driving the arm 13 is decreased as the arm is rotated, i.e. as the range of movement of the arm is increased, as will be seen from FIGS. 3a and 3b.

Representing the force from the motor by F and the angle of rotation of the arm by $\theta$, the force F' for driving the arm is expressed as follows:

$$F' = F \cos\theta.$$

When the rotation angle $\theta$ is 90°, the driving force F' is nullified, i.e. becomes zero, so that the arm cannot be driven. Thus, in the arm driving mechanism incorporating a single link, the pressure angle of the arm driving force is increased as the range of rotation of the arm is increased, so that the load imposed on the motor is increased when the arm is rotated to a position of large rotation angle. Thus, the arm driving mechanism incorporating a single link inherently involves problems concerning the load imposed on the motor and the range of rotation of the arm.

Accordingly, it is an object of the present invention to provide an improved industrial robot which increases the range of rotation of the arm and reduces the load imposed on the motor, to thereby overcome the above-described disadvantages of the prior art.

It is another object of the invention to provide an improved industrial robot which enables a realization of a high precision stopping position of the wrist in the vertical direction while reducing the rotational inertia of the swingable portion to permit a small capacity motor to drive the arm at a high speed.

It is still another object of the invention to provide an industrial robot provided with a wrist device having three degrees of freedom in which the mechanical transmission between the wrist device and the driving device attached to an arm of the like member is simplified to realize a compact and small-sized construction of the industrial robot.

To these ends, according to the invention, the output power of the motor is transmitted to the arm through a double link mechanism having a phase difference of motion. More particularly, the double link mechanism includes a pair of cranks and a pair of links. The combination of the cranks and links transmits the power of the motor with a certain phase difference and, according to this arrangement, it is possible to increase the range of rotation of the arm while reducing the load imposed on the motor, to thereby overcome the problem of the prior art.

The links of the double link mechanism are arranged to avoid interference with the arms and the shafts of the cranks to further increase the range of rotation of the robot arm.

Furthermore, two links are arranged such that the distance between two links is minimized when the first and the second arms are stretched to make their longitudinal axes extend along a line. The rotation of the arm of the robot is commenced or ended in this state. This arrangement permits further increase of the range of rotation of the robot arm.

According to another aspect of the invention, the industrial robot has a motor mounted on a stationary member, winding power transmitting means through which the output power is transmitted to a second arm, and mechanicl conversion means provided on the end of the second shaft and adapted for converting a rotational motion into a linear motion, whereby a tool holding shaft is reciprocatingly moved up and down by the rotational output power derived from the motor. In this arrangement, a drive motor for rotating the second arm is mounted on a stationary member so that the rotational inertia of the swingable or rotational members is reduced. The above mentioned double link mechanism is used to transmit the output power of this motor to the second arm, to thereby ensure smooth rotation of the arm.

According to still another aspect of the invention, the wrist device of the industrial robot is provided with a mechanical power transmitting mechanism for drivingly connecting a transmission shaft concentric with the axis of rotation of the rotary housing to a drive shaft which is concentric with or parallel to the transmission shaft and for permit the transmission of power between the shafts regardless of the posture of an oscillation housing.

DETAILED DESCRIPTION

Figure 6:
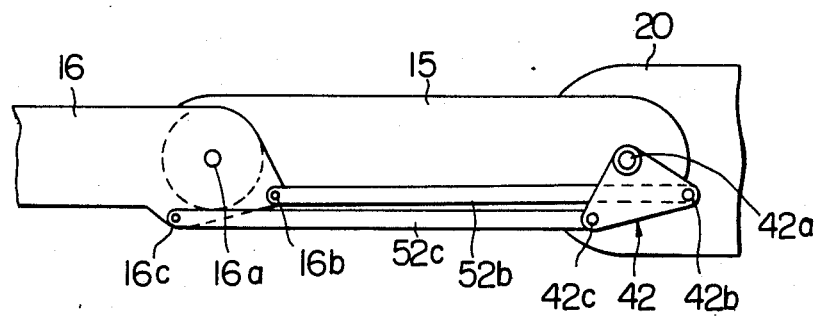
FIG. 6 is a plan view of a double link mechanism.
Figure 4:
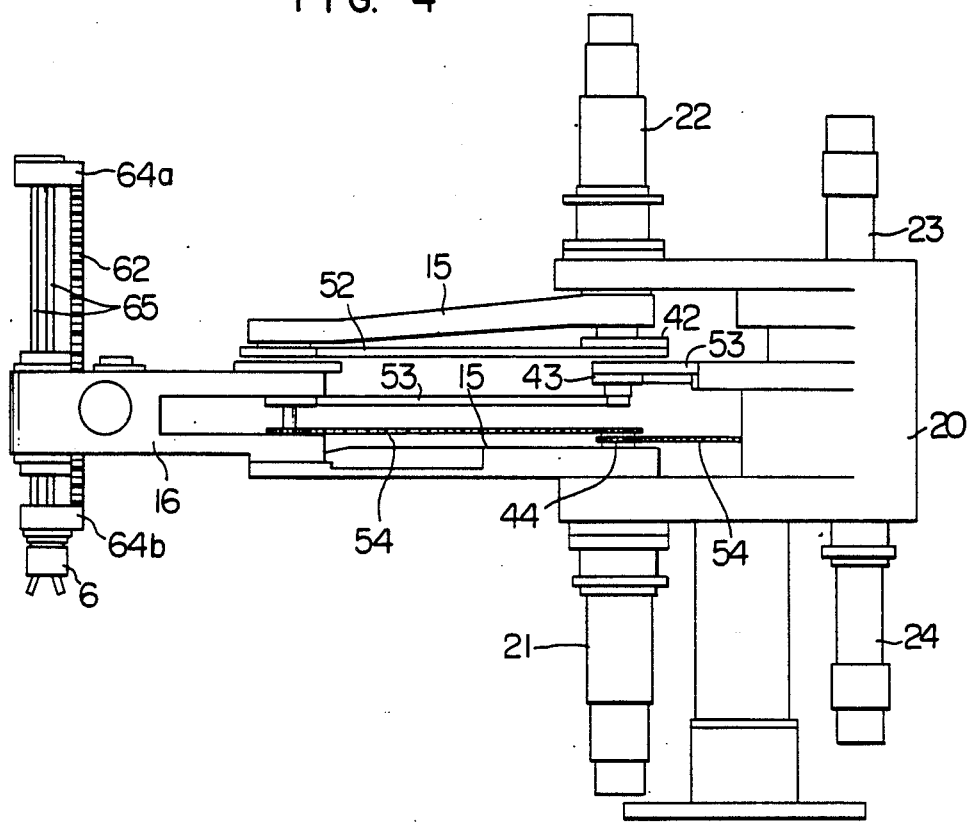
FIG. 4 is a side elevational view of an industrial robot in accordance with an embodiment of the invention.
Figure 5:
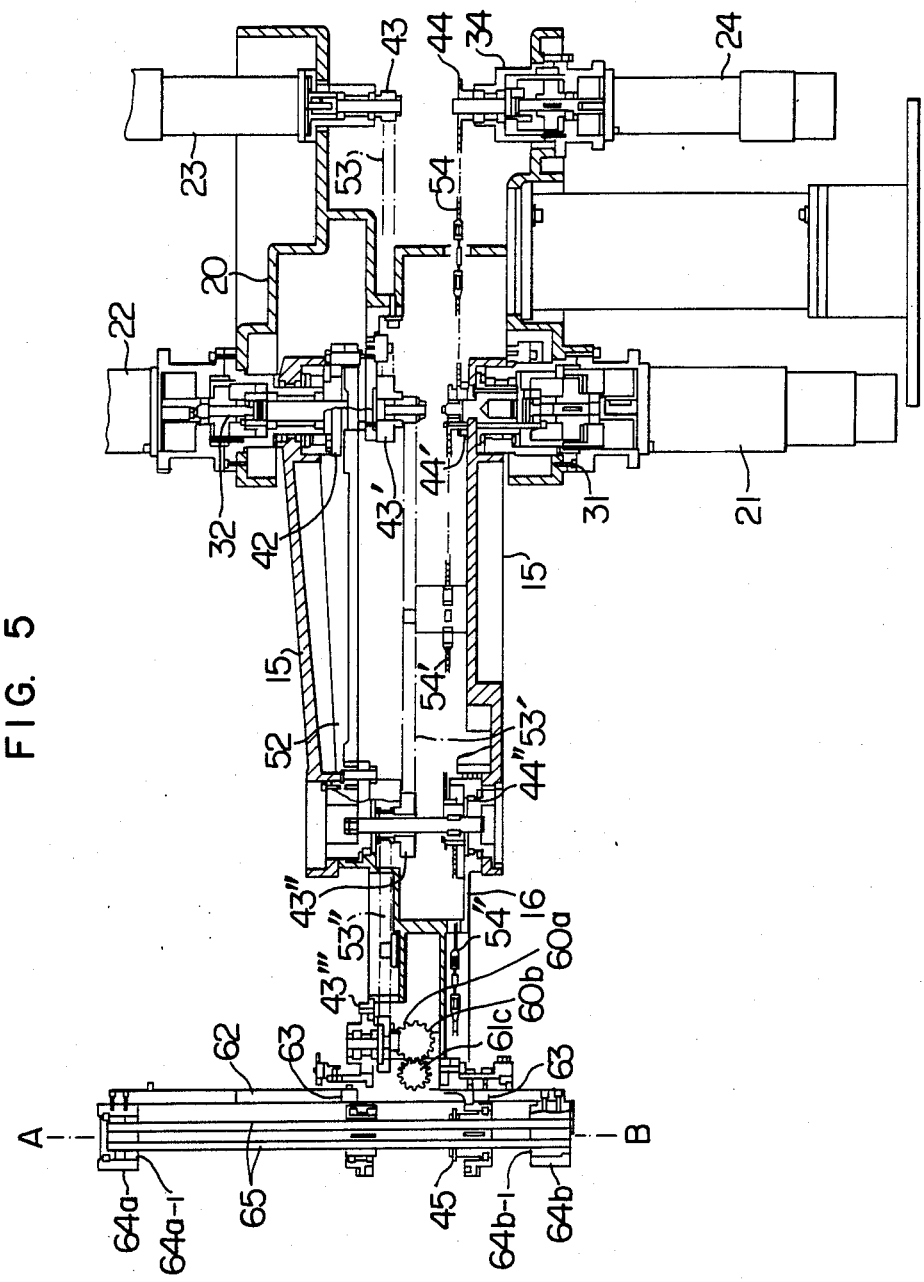
FIG. 5 is a side elevational sectioanl view of the industrial robot as shown in FIG. 4 taken along the center thereof.

Referring to FIGS. 4 and 5, the industrial robot has a two-articulation structure composed of a first arm 15 and a second arm 16, with four driving motors 21, 22, 23 and 24 all mounted on a stationary post 20. The first arm 15 is driven directly thorugh a speed reducer 31 by the driving motor 21 which is a D.C. servo motor mounted coaxially with the pivot shaft supporting the first arm, with the second arm 16 being driven by a double crank 42 to which power is transmitted through a speed reducer 32 from the driving motor 22 which is a D.C. servo motor mounted coaxially with the pivot shaft 16a of the first arm 15. As shown in FIG. 6, the double crank 42 is provided with two crank pins 42b, 42c which are arranged at a 90° phase difference from each other around the central shaft 42a. Also, the second arm 16 is provided at a base portion thereof with two crank pins 16b, 16c which are arranged at a 90° phase difference from each other around a second shaft supporting the second arm 16. The crank pin 42b and the crank pin 16b are connected to each other by a connecting rod 52b. Similarly, the crank pin 42c and the crank pin 16c are connected to each other by a connecting rod 52c.

As clearly shown in FIG. 6, the positions of the crank pins 16b, 16c, 42b, 42c are so selected as to avoid the interference of the connecting rods 52b, 52c with the second shaft 16a constituting the axis of rotation of the second arm 16 and the drive shaft 42a of the double crank 42 within the range of swinging of these rods 52b, 52c to thereby attain a large range of rotation of the second arm 16.

In addition, the connecting rods 52b, 52c are arranged such that the distance between the rods 52b, 52c is minimized when the first arm 15 and the second arm 16 are stretched to be ona straight line in the longitudinal direction thereof. The rotation of the second arm 16 with respect to the first arm 15 is commenced or ended in the state in which the distance between two connecting rods is minimized, i.e., in the state in which the first arm 15 and the second arm 16 are on a straight line, to thereby further increase the range of rotation of the second arm 16.

The practical difference ranges between 90° and 120° but is preferably selected to be substantially 90° in order to maximize the efficiency of pressure angle of one connecting rod while the other connecting rod is in its dead point.

Referring to FIG. 4, the wrist mechanism includes an upper base 64a and a lower base 64b arranged in a pair, a rack 62 through which the bases 64a, 64b are connected to each other, a pair of slide shafts 65 supported by the bases 64a, 64b for rotation in a manner explained below, and a wrist 6 attached to the lower ends of the slide shafts 65.

Figure 7:
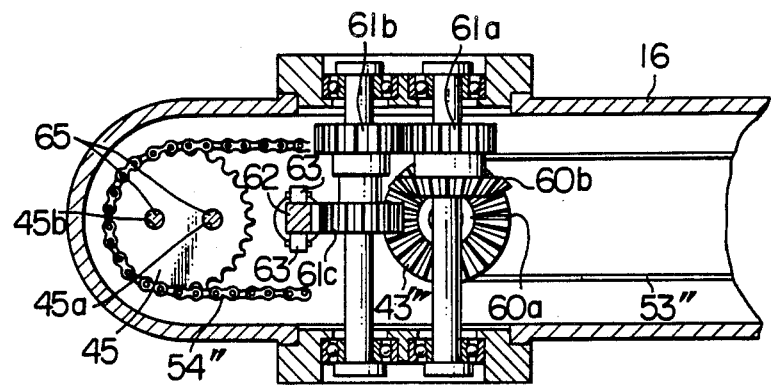
FIG. 7 is a sectioanl plan view of a tool holding drive portion.

As shown in FIG. 5, the upper and lower bases 64a, 64b respectively rotatably carry rotary brackets 64a-1, 64b-1, respectively with the slide shafts 65, 65 being fixed at their upper and lower ends to the rotary brackets 64a-1, 64b-1. Thus, the slide shafts 65, 65 are supported for free rotation around the center line A-B of the slide shafts 64, 65. Referring also to FIG. 7, the second arm 16 has a sprocket 45 rotatably carried at an end thereof with the slide shafts 65, 65 being slidably received by two holes 45a, 45b formed in the sprockets 45, so that the wrist mechanism, carrying the wrist 6 is rotatably supported on the free end of the second arm 16. The wrist mechanism is adapted to be twisted through the sprocket 45 and to be moved up and down through the rack 62.

As will be understood from FIGS. 4 and 5, the drive motor 24, which is a D.C. servomotor carried by the post 20, second arm 16 through a speed reducer 34, a sprocket 44 and a chain 54 so as to drive the sprocket 45 to thereby cause a twisting motion of the wrist (see FIG. 5).

The power transmission through the chain 54 reaches the end of the second arm 16 through an idle sprocket 44' coaxial with the first shaft supporting the first arm 15 and another idle sprocket 44" coaxial with the second shaft supporting the second arm 16. According to this arrangement, it is possible to transmit the power through chains 54', 54" without fail regardless of the rotation of the first arm 15 around the first shaft and the rotation of the second arm 16 around the second shaft. This effect can equally be produced by a winding type power transmission system such as a combination of a chain and sprockets, a belt and pulleys or a wire rope and drums.

Referring specifically to FIG. 5, a D.C. servomotor 23 is carried by the post 20. The rotation output of the motor 23 is transmitted to a two-stage pulley 43' through a timing pulley 43 and a timing belt 53 and, through a speed reduction achieved by the two-stage pulley 43', to another two-stage pulley 43" through a timing belt 53'. The power is further transmitted through a speed reduction by the two-stage pulley 43" and a timing belt 53" to a pulley 43'" to thereby drive a bevel gear 60a coaxial with the pulley 43'".

Referring now to FIG. 7, the rotation of the bevel gear 60a is transmitted through a bevel gear 60b, a spur gear 61a and a spur gear 61b to a pinion 61c so that the rack 62, guided by rollers 63, 63 is moved up and down by the rotation of the pinion 61c. The vertical movement of the rack 62 causes a vertical movement of the upper and lower bases 64a, 64b (see FIG. 4) and, hence, a vertical movement of the wrist 6. Since the vertical movement of the wrist 6 is made by the D.C. servomotor 23 through the rack 62 and the pinion 61c, it is possible to freely move the wrist up and down and to stop the same precisely at the desired position in its vertical stroke. According to this arrangement, the undesirable increase of the rotational inertia is avoided because the heavy motor 23 is carried by the stationary post 20. It is to be noted also that the power transmission from the motor 23 to the pinion 61c does not obstruct the rotation of the first arm 15 and the second arm 16. This effect is produced by any arrangement in which the rotational output of a motor mounted on a stationary member is transmitted to the wrist mechanism through a winding power transmission mechanism and the wrist mechanism having a tool holding shaft is driven through conversion means for converting a rotational motion into a linear motion. Such conversion means may be a combination of a feed screw and a nut or other know mechanism.

As will be seen from FIG. 4, the D.C. servomotor 22 is adapted to rotate the double crank 42. The rotation of the double crank 42 is transmitted to the second arm 16, shown in FIG. 6, through two power transmission systems having a 90° phase difference from each other, i.e. the first system including the crank pin 42b the connecting rod 52b, the carnk pin 16b, the second system including the crank pin 42c, the connecting rod 52c and the crank pin 16c, to thereby drive the second arm 16. With this arrangement, it is possible to rotate the second arm 16 over a wide range without forming any dead point and, in fact, in the described embodiment, it is possible to rotate the second arm 16 over a wide range of about 270°.

Figure 9:
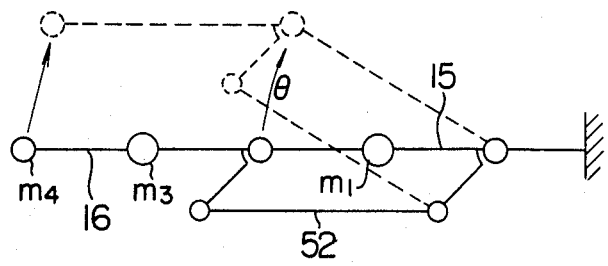
FIG. 9 is a schematic illustration of a link mechanism incorporated in an industrial robot embodying the present invention.

In addition, the above-mentioned double link mechanism operates in such a manner that the crank pins 42b, 42c, 16c, 16b always constitute the apexes of a parallelogram. Therefore, as the first arm 15 is rotated while keeping the double crank 42 stationary, the second shaft 16a rotates along an arcuate path and the second arm 16 moves in a translational manner as shown in FIG. 9.

In the industrial robot of the invention, the rotational inertia is much smaller as compared with the conventional industrial robot because the second arm 16 moves translationally and all of the drive motors are carried by the stationary post member 20.

The theory or principle of operation of the industrial robot of this embodiment will be explained hereinbelow with reference to FIGS. 8 and 9.

Figure 1:
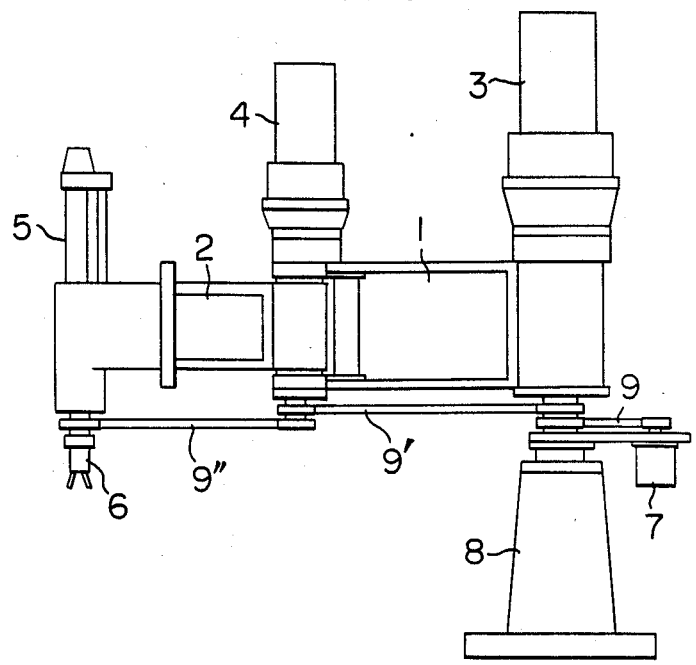
FIG. 1 is a side elevational view of an example of conventional industrical robots.
Figure 2:
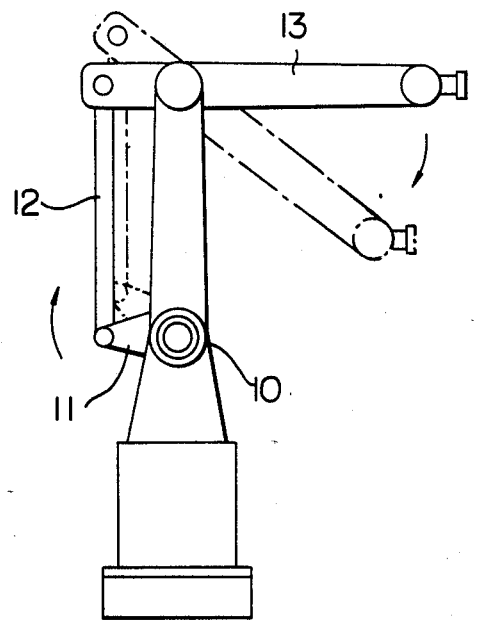
FIG. 2 is a side elevational view of another example of conventional industrial robots.
Figure 3A:
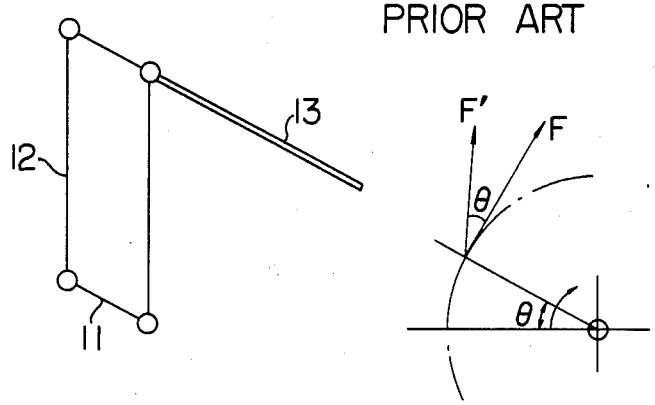
FIGS. 3a and 3b are schematic views illustrating the principle of operation of the arm driving mechanism of the industrial robot shown in FIG. 2.
Figure 3B:
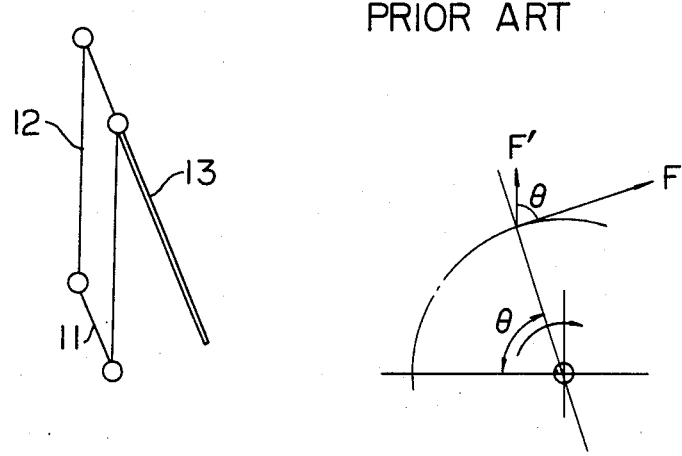
Figure 8:
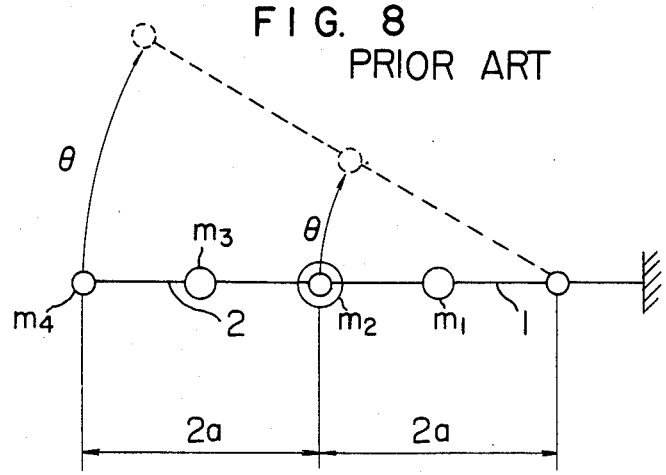
FIG. 8 is a schematic illustration of the link mechanism of a conventional industrial robot.

FIG. 8 schematically shows the operation of the conventional industrial robot of FIG. 1 in which the first arm 1 rotates by an angle $\theta$. In FIG. 8, the concentrated mass of the first arm is expressed by $m_1$, while the concentrated mass of the motor 4 for driving the second arm 2 is represented by $m_2$. Symbols $m_3$ and $m_4$ respectively represent the concentrated masses of the second arm 2 and the wrist mechanism, with the first and the second arms 1 and 2 having an equal length $2a$.

The rotation of the first arm 1 by an angle $\theta$ is followed by the rotation of the second arm 2 by the equal angle $\theta$. Therefore, the rotational inertia J caused by the rotation of the first arm 1 is determined as follows:

$$J = m_1 r_1^2 + m_2 r_2^2 + m_3 r_3^2 + m_4 r_4^2,$$

where, $r_1$, $r_2$, $r_3$ and $r_4$ respectively represent the radii of rotation of the masses $m_1$, $m_2$, $m_3$ and $m_4$.

FIG. 9 shows schematically the operation of the embodiment of the present invention when the first arm 15 is rotated by an angle $\theta$. As explained before in connection with FIG. 6, in the industrial robot of the present invention, second arm 16 makes a translational motion along an arcuate path when the first arm 15 is rotated by an angle $\theta$. Therefore, the length of the first arm 15 is not included by the radius of rotation of the second arm 16. The load inertia J' on the first arm 15 is expressed as follows:

$$J' = (m_1 + m_5)r_1^2 + m_3 r'_3{}^2 + m_4 r'_4{}^2,$$

where, $m_5$ represents the mass of the link 52.

Assuming here that the first and the second arms 15 and 16 have an equal length $2a$, a comparison will be made between the load inertia J shown in FIG. 8 and the load inertia J' shown in FIG. 9.

$$J = m_1 a^2 + m_2(2a)^2 + m_3(3a)^2 + m_4(4a)^2$$
$$= (m_1 + 4m_2 + 9m_3 + 16m_4)a^2,$$

and $$J' = (m_1 + M_5)a^2 + m_3 a^2 + m_4(2a)^2 = (m_1 + m_3 + 4m_4 + m_5)a^2.$$

From a design point of view, the mass $m_2$ is clearly greater than $m_5$ and, m therefore, the inertia J is apparently much greater than the inertia J'.

The values of the inertia J and the inertia J' are calculated on assumption that the masses $m_1$, $m_2$, $m_3$, $m_4$ and $m_5$ are 5 Kg, 4 Kg and 1 Kg, respectively, while the arm length $2a$ is 0.4 m. With these numerical values, the inertia J and the inertia J' are calculated to be 3.24 Kgm$^2$ and 0.72 Kgm$^2$, respectively. Thus, the load inertia of the first arm 15 is reduced almost to 1/5 (one fifth) as compared with the conventional industrial robot.

Consequently, according to the invention, it is possible to reduce the capacity of the motor for driving the first arm 15 having the conventional operational speed. To the contrary, if the drive motor of the same capacity as the prior art is used, the operation speed is increased remarkably.

As has been described, according to the invention, there is provided an industrial robot of two-articulation type, comprising winding transmission means for rotatingly driving a tool holder shaft, a drive motor fixed to a stationary member and adapted for rotatingly driving the tool holder shaft, winding transmission means for reciprocatingly driving the tool holder shaft in the axial direction thereof, a drive motor mounted on a stationary member and adapted for reciprocatingly driving the tool holder shaft, conversion means for converting a rotary motion into a linear motion, and a double link mechanism for connecting a second arm to a drive shaft which is coaxial with the pivot support shaft for supporting a first arm. According to this arrangement, it is possible to stop the wrist at any desired position in its vertical stroke at a high positional precision. In addition, the rotational inertia of the rotary portion is reduced to permit drive motor of small capacity to operate the robot at a high operation speed. Furthermore, it is possible to rotate the second arm over a large angular range with respect to the second arm advantageously.

Figure 10:
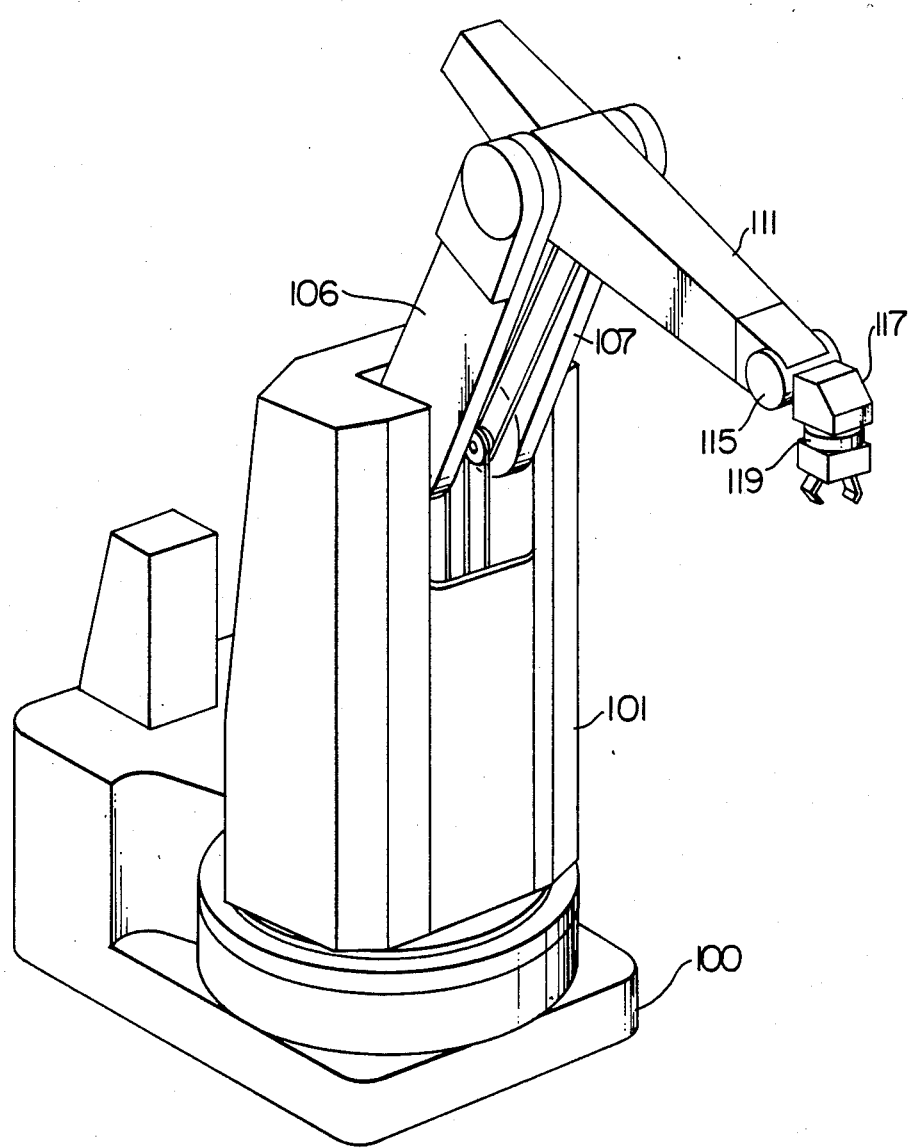
FIG. 10 is a schematic perspective view of an industrial robot in accordance with another embodiment of the invention.
Figure 11:
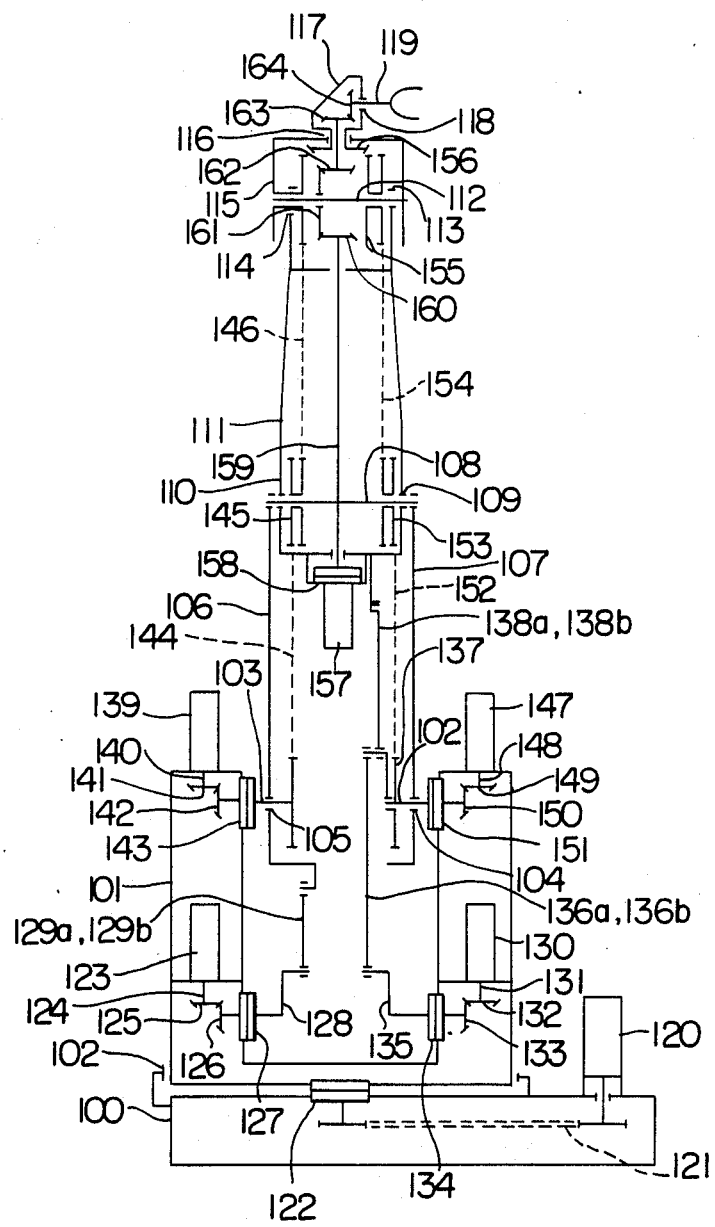
FIG. 11 shows the construction of an industrial robot as shown in FIG. 10.

As shown in FIGS. 10 and 11, in accordance with another embodiment of an industrial robot in accordance with the present invention, a rotary post 101 is rotatably connected at its one end to the base 100 through a rotary bearing 102, so that the rotary post 101 is allowed to rotate with respect to the base 100 thereby providing a first degree of freedom. A pair of first arms 106, 107 are rotatably secured at their one ends to shafts 102, 103 mounted on the other end of the rotary post 101 through rotary bearings 104, 105 so that the pair of first arms 106, 107 are allowed to rotate with respect to the rotary post 101 thereby providing a second degree of freedom. A second arm 111 is rotatably secured at its one end to a shaft 108 mounted on the other ends of the first arms 106, 107 through rotary bearings 109, 110 so that the second arm 111 can rotate with respect to the pair of first arms 106, 107 thereby providing a third degree of freedom. A wrist bending member 115 is rotatably connected at its one end to a shaft 112 mounted on the other end of the second arm 111 through rotary bearings 113, 114 so that the wrist bending member 115 is allowed to rotate with respect to the second arm 111 to provide a fourth degree of freedom. A wrist twisting member 117 is rotatably connected at its one end to the other end of the wrist bending member 115 through a rotary bearing 116 so that the wrist twisting member 117 is rotatable with respect to the wrist bending member 115 to provide a fifth degree of freedom. A wrist twirling member 119 is connected at its one end to the other end of the wrist twisting member 117 through a rotary bearing 118, so that the wrist twirling member 119 is rotatable with respect to the wrist twisting member 117 to provide a sixth degree of freedom.

The rotation of the rotary post 101 with respect to the base 100 is caused by the power of a rotational driving source 120 such as a D. C. servomotor through a winding type power transmission system 121 such as a timing belt at a speed reduced by a speed reducer 122. The rotation of the pair of first arms 106, 107 around the shafts 102, 103 relative to the rotary post 101 is caused by the power derived from the output shaft 124 of a rotational driving source 123 such as a D.C. servo motor incorporated in the rotary post 101, through meshing bevel gears 125, 126, a speed reducer 127, a crank 128 and two links 129a, 129b.

The rotation of the second arm 111 around the shaft 108 relative to the pair of first arms 106, 107 is caused by the power derived from the output shaft 131 of a rotational driving source 130 such as a D.C. servomotor mounted in a rotary post 101, through meshing bevel gears 132, 133, a speed reducer 134, a crank 135, two links 136a, 136b, a crank 137, rotatable with respect to the shaft 102, and two links 138a, 138b.

The rotation of the wrist bending members 115 around the shaft 112 with respect to the second arm 111 is caused by the power derived from the output shaft 140 of a rotary driving source 139 such as a D.C. servomotor 139 mounted in a rotary post 101, through bevel gears 141, 142, a winding transmission system 144 which may, for example, be a chain a part of which is substituted by a rigid rod for increasing the rigidity, a transmission wheel in the form of, for example, a sprocket 145 and another winding type transmission system 146 which also may, for example, be a chain a part of which is substituted by a rod to increase rigidity.

The relative motion between the wrist bending member 115 and the wrist twisting member 117 is caused by the power derived from the output shaft 148 of a rotational driving source 147 such as a D.C. servomotor mounted in a rotary post 101, through bevel gears 149, 150, a speed reducer 151, a winding type transmission system 152 which may, for example, be a chain a part of which is substituted by a rod to increase rigidity, a transmission wheel 153 which may, for example, be a sprocket, rotatable with respect to the shaft 108, a winding type transmission system 154 such as a chain and bevel gears 155, 156.

The motion between the wrist twisting member 117 and the wrist twirling member 119 is caused by the power derived from a rotational driving source 157 such as a servomotor attached to the second arm 111, through a speed reducer 158, a shaft 159, bevel gears 160, 161, 162 and bevel gears 163, 164 incorporated in the wrist twirling member 117.

By adopting this arrangement, it is possible to mount heavy and large rotational driving sources and speed reducers at positions remote from the wrist so that the size and weight of the wrist are advantageously reduced. In addition, it is possible to operate the wrist with three degrees of freedom.

Figure 14B:
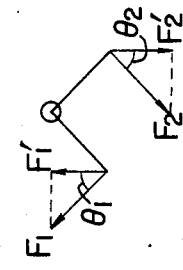
FIGS. 14a, 14b, 14c and 14d are illustrations of the principle of operation of the arm driving mechanism in accordance with the invention incorporating the double link mechanism.
Figure 14A:
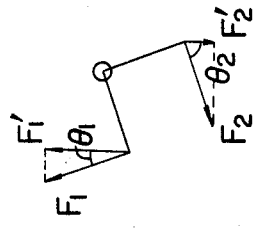
Figure 14D:
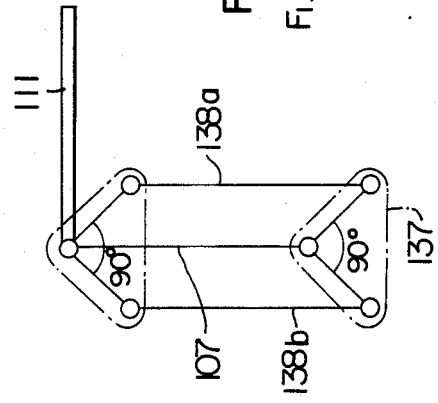
Figure 14C:
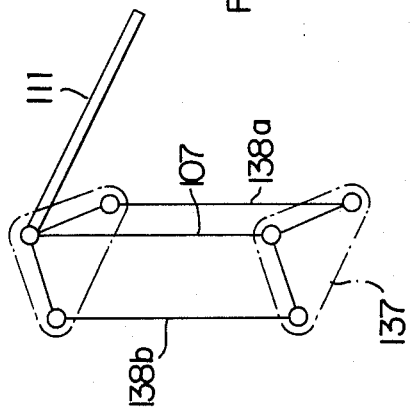

By using the described arm driving mechanism incorporating a double crank of a 90° phase difference in combination with links, it is possible to prevent the pressure angle $\theta$ of the arm driving force F' from becoming greater than 45° as will be seen from FIGS. 14a, 14b, 14c and 14d illustrating the principle of operation of the embodiment of FIGS. 10 and 11. Namely, since the crank is arranged doubly as shown in FIG. 14a, it is possible to obtain such an effect that, when the pressure angle of one of two cranks becomes greater, the pressure angle of the other of two cranks gets smaller and the pressure angle is maximized when both pressure angles become equal to each other. In such a state, the pressure angles take equally a value of 45° and the arm driving force F' is given as follows:

$$F' = F \cos \theta \geq F \cos 45°.$$

Figure 12:
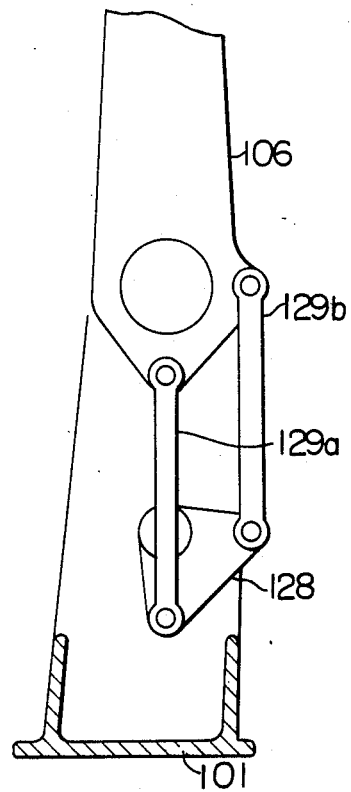
FIG. 12 is a sectional view of a double link mechanism for driving a first arm in the industrial robot shown in FIG. 10.
Figure 13:
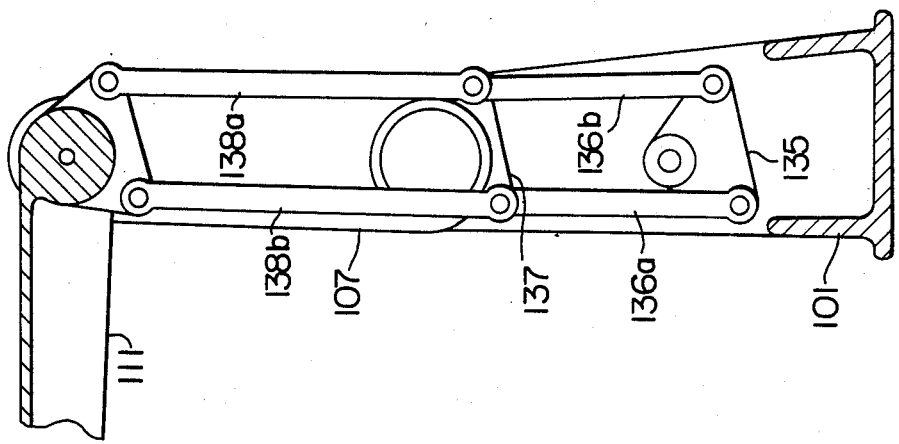
FIG. 13 is a sectional view of a double link mechanism for driving a second arm in the industrial robot shown in FIG. 10.

As will be seen from FIGS. 12 and 13, positions of the crank pins are suitably selected to avoid interference of pairs of links 129a, 129b; 136a, 136b and 138a, 138b with the pivot shaft for the second arm 111, pivot shaft for the first arm 106 and shafts of the cranks 128, 135, 137 respectively, to thereby afford a greater range of rotation of the arms.

In the embodiment of FIGS. 10 and 11, the links, arranged in pairs for respective double cranks, are arranged such that the distance between two links in each pair is minimized when the second arm 111 and the first arm 107, and the rotary post 101 are stretched to be on straight lines in the longitudinal direction of arms, and the rotation of arms 107, 111 is commenced or ended from these states to increase the range of rotation of the arms 107, 111. The above-mentioned phase difference practically ranges between 90° and 120°. However, in order to maximize the efficiency of pressure angle of one link when the other link is in its dead point, the phase difference is most preferably selected to be 90°. In accordance with the embodiment of FIGS. 10 and 11, it is possible to prevent the pressure angles of the cranks and the links from becoming greater than the half of a phase difference of a double crank due to the use of a double crank having a certain phase difference in combination with links, so that the load imposed on the driving motor is advantageously decreased. In addition, the ranges of operation of the robot arms 107, 111 can be increased to attain higher performance and efficiency of industrial robots.

Although the invention has been described through specific terms, it is to be noted here that the described embodiments of the invention are only illustrative and various changes and modifications may be imparted thereto without departing from the scope of the invention which is limited solely by the appended claims.

What is claimed is:

1. An industrial robot comprising:
   a post;
   a first arm pivotally supported at a first end thereof for rotation around a first shaft provided on said post;
   a second arm pivotally supported at a first end thereof by a second end of said first arm for rotation around a second shaft;
   a wrist mechanism carried by a free end of said second arm and having a plurality of degrees of freedom;
   a first driving motor mounted on said post for generating a rotational output transmitted to said first arm for driving said first arm;
   a second driving motor mounted on said post for driving said second arm;
   a third driving motor for generating a rotational output transmitted through a transmission mechanism to said wrist mechanism for driving said wrist mechanism; and
   a double parallel crank mechanism including first and second parallel crank mechanisms, said first parallel crank mechanism being formed by the first arm, a crank driven by the second driving motor and connected to the first arm through a first pivot, a first link connected to the crank through a second pivot, and the second arm connected to the first link through a third pivot and connected to the first arm through a fourth pivot, said second parallel crank mechanism being formed by the first arm, the crank connected to the first arm through the first pivot, a second link connected to the crank through a fifth pivot, and the second arm connected to the second link through a sixth pivot and connected to the first arm through the fourth pivot, and said double parallel crank mechanism has a phase difference, defined as an angle formed by the second, first and fifth pivots of substantially a range of 90°–120°.

2. An industrial robot according to claim 1, wherein all links of said double parallel crank mechanism are arranged so as to not interfere with said first and second shafts around which said first and second arms rotate, as well as the drive shafts of said driving motors, thereby ensuring a large range of rotation of said first and second arms.

3. An industrial robot according to claim 1, wherein the pair of links are arranged for contacting each other when said first and second arms are stretched such that their longitudinal axes are on a straight line thereby ensuring a large range of rotation of said arms.

4. An industrial robot according to claim 1, wherein said phase difference is substantially 90°.

5. An industrial robot according to claim 1, wherein said wrist mechanism comprises an upper base, a lower base, and a rack means for interconnecting said upper and lower bases for moving said wrist mechanism upwardly and downwardly, rotary brackets respectively rotatably carried by said upper and lower bases, a pair of slide shafts fixed to said rotary brackets at upper and lower ends thereof, said slide shafts being slidably received by two holes formed in a sprocket of said second arm and a wrist attached to lower ends of said slide shafts, said third driving motor means comprises two motors mounted on said post, and
   wherein said transmission mechanism is a winding type power transmission system having idle transmission elements which are coaxially provided to said first and second shafts, respectively.

6. An industrial robot according to claim 1, wherein said industrial robot further comprises additional two double parallel crank mechanisms, one of said last mentioned double parallel crank mechanism being provided for moving said first arm and being formed by a crank pivotally mounted on said post, said arm, said post, and two links interconnecting said crank and said first arm, the other of said last mentioned double parallel crank mechanisms being provided for moving said crank pivotally mounted on said first end of said second arm and being formed by another crank pivotally mounted on said post, said crank pivotally mounted on said first end of said second arm, said post and two links interconnecting said another crank and said crank pivotally mounted on said first end of said second arm,
   said third driving motor means comprises two motors mounted on said psot, and
   wherein said transmission mechanism is a winding type power transmission system having idle transmission elements which are coaxially provided to said second shaft.

* * * * *